United States Patent Office 2,998,461
Patented Aug. 29, 1961

2,998,461
STABILIZATION OF TRICHLOROETHYLENE
Donald H. Campbell, Niagara-on-the-Lake, Ontario, Canada, assignor to Hooker Chemical Corporation, Niagara Falls, N.Y., a corporation of New York
No Drawing. Filed Apr. 15, 1959, Ser. No. 806,461
2 Claims. (Cl. 260—652.5)

This application relates to the stabilization of chlorinated hydrocarbon solvents, such as trichloro- and perchloroethylenes. More particularly, this invention relates to the stabilization of trichloroethylene against the major types of solvent decomposition occurring in the industrial uses of this material, especially in metal degreasing. Accordingly, this invention will be explained using trichloroethylene and metal cleaning as the illustrative embodiments so that it may be more readily understood.

Trichloroethylene is widely used in industry for a number of purposes, some of which are: as a vapor degreasing solvent, as a solvent in ultrasonic cleaners, as a thinner for paints, as a freezing point depressant in fire extinguishing fluids, as a solvent in the application of protective finishes to metals such as in phosphatizing, as an extraction solvent for vegetable oils, and as a heat transfer medium. Trichloroethylene itself is a reactive chemical and in many of the uses of this material, it is exposed to air, light, a variety of metals often in finely divided state with reactive surfaces, heat, and a great many other reactive materials. Therefore, before trichloroethylene can be utilized in many of these applications, it must be stabilized by the addition of minor amounts of compounds which inhibit the decomposition of the trichloroethylene under its conditions of use. For example, when trichloroethylene is to be used as the solvent in the vapor degreasing process for cleaning metals, the conditions affecting solvent stability vary greatly from one degreasing operation to another and some of the factors influencing solvent stability call for much more stable solvents than generally provided in commercially available trichloroethylene. Thus, one may successfully and repetitively degrease the more inert metals, e.g. stainless steel, with solvent of average stability but extensive decomposition can occur when the same solvent is repetitively used for the degreasing of aluminum parts where there are large quantities of aluminum turnings and fines to be removed along with the other soils. The very large surface area and highly active strained surfaces of the metal fines, coupled with their tendency to build up around the heating coils of the degreaser to cut down solvent circulation and provide "hot-spots," all cause a severe strain on the stabilizing system of the trichloroethylene and thereby deleteriously affecting its satisfactory, efficient and continued use in the degreasing process.

The use of trichloroethylene as a paint thinner in paints such as in the hot dip paint process (United States Patents 2,515,489; 2,728,686; 2,728,952; 2,739,567; 2,783,165) or the flowcoat process (United States Patent 2,861,897) presents further problyems in that the trichloroethylene is kept hot and in contact with metals and exposure to the many constituents of paints, such as the resins, driers, pigments, extender pigments, etc., over an extended period of time thereby deleteriously affecting its satisfactory, efficient and continued use in these processes.

Other uses of trichloroethylene present similar problems in that the conditions of use are such as to require careful stabilization if decomposition of the trichloroethylene is to be avoided.

The exact mechanism by which the trichloroethylene breaks down is not known, but it is generally considered that the major decomposition reactions are oxidation and metal catalyzed condensations. In any event, the need for a stabilizing system for trichloroethylene which would more satisfactorily inhibit the major decomposition reactions is well established.

One object of this invention is the provision of a novel and effective method of stabilizing trichloroethylene against the major types of decomposition reactions that take place under severe use conditions.

A further object is the provision of trichloroethylene stabilized by the inclusion therein of a combination of substantially co-boiling stabilizers which need only be present in relatively small concentrations, usually a fraction of one percent, such combination of stabilizers being remarkably effective in preventing the decomposition of trichloroethylene.

I have discovered that when tetrahydrofuran is present with N-methyl pyrrole, this stabilizer combination possesses markedly increased effectiveness as a stabilizer for trichloroethylene. Neither of these additives when used apart from each other is particularly effective under the conditions occurring at the onset of solvent decomposition. However, the combination is surprisingly effective, especially after the solvent has been used for its intended purpose.

The quantity of tetrahydrofuran used may be considerably larger than that of the more expensive N-methyl pyrrole, thus effecting appreciable saving in the stabilizer costs. Tetrahydrofuran may be used in the concentration of about 0.01 to 1.0 weight percent and preferably in the range of 0.1 to 0.5 weight percent. The N-methyl pyrrole may be used in the concentration of about 0.001 to 0.10 weight percent and preferably in the range of 0.01 to 0.05 weight percent. I have also found that the presence of other additives, e.g., those presently used in the industry designated "MD" or metal degreasing grade, does not interfere with the synergistic stabilizing action of the N-methyl pyyrrole-tetrahydrofuran combination of this invention.

The following test procedure was devised to evaulate the stabilities of trichloroethylene samples under conditions which simulate the conditions at the onset of decomposition. To accelerate the test such that it occurs within a practical length of time for evaluation, the trichloroethylene samples were tested for six hours at reflux temperatures in the presence of oxygen and a minor amount of aluminum chloride. In most uses of trichloroethylene, major causes of decomposition are due to metal catalysts or oxidation. Aluminum chloride was added to these samples, since it is one of the most vigorous of the metal catalysts and is a good material to indicate the effect of a metal catalyst on the samples used. The oxygen was added to measure the amount of oxidation present in each sample. The percentages given in the procedure and examples are by weight.

Dry oxygen was metered into each of the four test flasks which were 500 milliliters Erlenmeyer flasks with side inlet tubes extending to within one-eighth inch to one-quarter inch from the bottom. The flasks were mounted on small hot plates placed around and equidistant from an ultraviolet lamp (General Electric AH$_4$ 100 watt) and were surmounted by reflux condensers connected to gas washing bottles containing distilled water.

The trichloroethylene samples were placed in the test flasks along with anhydrous aluminum chloride. Oxygen at 120 milliliters per minute was passed through each flask and the contents heated under reflux for six hours. The evolved HCl was carried to the gas washing bottles by the oxygen and the quantities evolved determined by titration every hour with 0.1 N base. HCl being a major decomposition product, the greater the amount of HCl evolved the greater the decomposition. At the end of the reaction time the oxygen flow was increased to 270 milliliters per minute for ten minutes. The reaction flasks were cooled and their contents filtered. The colors were measured by comparison with Gardner or Saybolt standards. The colors of the samples are an indication of the amount of trichloroethylene which decomposes. The lighter the color the less trichloroethylene in the sample decomposed. These Gardner and Saybolt tests are standard tests widely used to measure color. In the Gardner test, the higher the number, the darker the color. Under the Saybolt standard, the higher the number, the lighter the color. The extent of decomposition was also measured by the quantity of iodine released from a KI-acetone solution and the amounts were expressed as the volume of 0.1 N sodium thiosulfate required to titrate the iodine. Thus, a measure of the quantity of oxidation products, such as peroxide and the like, was obtained. A direct test for one of the decomposition products, phosgene, was carried out using a 0.1 percent solution of benzidine in toluene.

*Example I*

Anhydrous aluminum chloride (0.1 gram) was placed in each test flask having 200 milliliters of unstabilized trichloroethylene with: "A" no stabilizer, "B" 0.05 percent tetrahydrofuran, "C" 0.005 percent N-methyl pyrrole and "D" 0.025 percent tetrahydrofuran with 0.0025 percent N-methyl pyrrole. The following results were obtained.

| Additive | Ml. of 0.1 N HCl Evolved | Ml. of 0.1 N $Na_2S_2O_3$ Required | Color (Gardner Test) |
|---|---|---|---|
| A. No Stabilizer | 106 | 498 | 3 |
| B. 0.05% Tetrahydrofuran | 77 | 383 | 1-2 |
| C. 0.005% N-methyl pyrrole | 121 | 438 | 3 |
| D. 0.025% Tetrahydrofuran with 0.0025% N-methyl pyrrole | 21 | 1.6 | 1-2 |

*Example II*

Following the same procedure as used in Example I, the test was repeated using the same concentration of stabilizers.

| Additive | Phosgene Test | Ml. of 0.1 N HCl Evolved | Ml. of 0.1 N $Na_2S_2O_3$ Required | Color Gardner | Color Saybolt |
|---|---|---|---|---|---|
| A. No Stabilizer | positive | 112 | 286 | 1-2 | <17 |
| B. 0.05% Tetrahydrofuran | do | 106 | 486 | 0-1 | 21 |
| C. 0.005% N-methyl pyrrole | do | 76 | 176 | 1-2 | <17 |
| D. 0.025% Tetrahydrofuran with 0.0025% N-methyl pyrrole | negative | 20 | 1.6 | 0-1 | 21 |

*Example III*

The apparatus and procedure as in Example I were used, but the amount of additive was changed as indicated below.

| Additive | Phosgene Test | Ml. of 0.1 N HCl Evolved | Ml. of 0.1 N $Na_2S_2O_3$ Required | Color Gardner |
|---|---|---|---|---|
| A. No Stabilizer | positive | 96 | 80 | 6-7 |
| B. 0.2% Tetrahydrofuran | do | 82 | 232 | 1-2 |
| C. 0.02% N-methyl pyrrole | do | 41 | 64 | 16-17 |
| D. 0.1% Tetrahydrofuran with 0.01% N-methyl pyrrole | negative | 22 | 24 | 2-3 |

*Example IV*

The apparatus and procedure as in Example I were used, but the amount of additive was changed as indicated below.

| Additive | Phosgene Test | Ml. of 0.1 N HCl Evolved | Ml. of 0.1 N $Na_2S_2O_3$ Required | Color Gardner |
|---|---|---|---|---|
| A. No Stabilizer | positive | 139 | (*) | 6-7 |
| B. 0.4% Tetrahydrofuran | do | 84 | 144 | 0-1 |
| C. 0.4% N-methyl pyrrole | do | 51 | (*) | 7-8 |
| D. 0.2% Tetrahydrofuran with 0.02% N-methyl pyrrole | weak | 28 | 40 | 0-1 |

*Too colored to detect end-point in titration.

The above examples give conclusive evidence of the effectiveness of the combination of N-methyl pyrrole and tetrahydrofuran. The extent of decomposition as measured by the HCl evolved, the presence of phosgene, the color and the amount of readily oxidized material (thiosulfate titration) demonstrates the stabilizing action of the tetrahydrofuran-N-methyl pyrrole combination. The results obtained in the examples are summarized in the following table to point out this effect.

| Sample | Average Mls. 0.1 N (All 4 Examples) | | |
|---|---|---|---|
| | HCl Evolved | $Na_2S_2O_3$ Required | Phosgene Test |
| 1. No Additive | 113 | 288 | All Positive. |
| 2. 0.05-0.4% tetrahydrofuran | 87 | 311 | Do. |
| 3. 0.005-0.04% N-methyl pyrrole | 72 | 226 | Do. |
| 4. 0.025-0.2% tetrahydrofuran and 0.0025-0.02% N-methyl pyrrole | 22 | 17 | 2 Negative. 1 Weak. |

In like manner and with equally improved results, metals such as aluminum, steel, copper, etc., may be successfully degreased with trichloroethylene containing the stabilizer pair or combination of this invention. Large-scale applications of the subject matter of this invention are current in commercial degreasers.

Using the combination of this invention with other stabilizers which do or do not add to the synergistic effect would not depart from the spirit of this invention. Various other modifications and ramifications of this invention will occur to those skilled in the art upon a reading of applicant's basic invention. These are intended to be encompassed within the scope of this invention.

I claim:

1. The method of stabilizing trichloroethylene against decompositon which comprises incorporating in said trichloroethylene a stabilizer comprising in combination about 0.01 to 1.0 percent by weight of tetrahydrofuran and about 0.001 to 0.10 percent by weight of N-methyl pyrrole.

2. A composition comprising in combination trichloroethylene with about 0.01 to 1.0 percent by weight of tetrahydrofuran and about 0.001 to 0.10 percent by weight of N-methyl pyrrole.

References Cited in the file of this patent

UNITED STATES PATENTS

| | | |
|---|---|---|
| 2,371,645 | Aitchison et al. | Mar. 20, 1945 |
| 2,742,509 | Starks | Apr. 17, 1956 |
| 2,795,623 | Starks | June 11, 1957 |
| 2,802,885 | Cole | Aug. 13, 1957 |
| 2,803,676 | Willis et al. | Aug. 20, 1957 |
| 2,870,094 | Cathcart | Jan. 20, 1959 |

UNITED STATES PATENT OFFICE
CERTIFICATE OF CORRECTION

Patent No. 2,998,461　　　　　　　　　　　　　　August 29, 1961

Donald H. Campbell

It is hereby certified that error appears in the above numbered patent requiring correction and that the said Letters Patent should read as corrected below.

Column 1, line 58, for "problyems" read -- problems --; column 2, line 35, for "pyyrrole-" read -- pyrrole- --; line 37, for "evaulate" read -- evaluate --; column 4, first table, under the heading "Additive", fourth line therefor, for "C. 0.4% N-methyl" read -- C. 0.04% N-methyl --.

Signed and sealed this 20th day of November 1962.

(SEAL)
Attest:

ERNEST W. SWIDER
Attesting Officer

DAVID L. LADD
Commissioner of Patents